July 15, 1958  E. D. HINDENBURG  2,842,992
WIRE STRIPPER
Filed Feb. 15, 1955  2 Sheets-Sheet 1

Inventor
Eugene D. Hindenburg by Parker & Carter
Attorneys

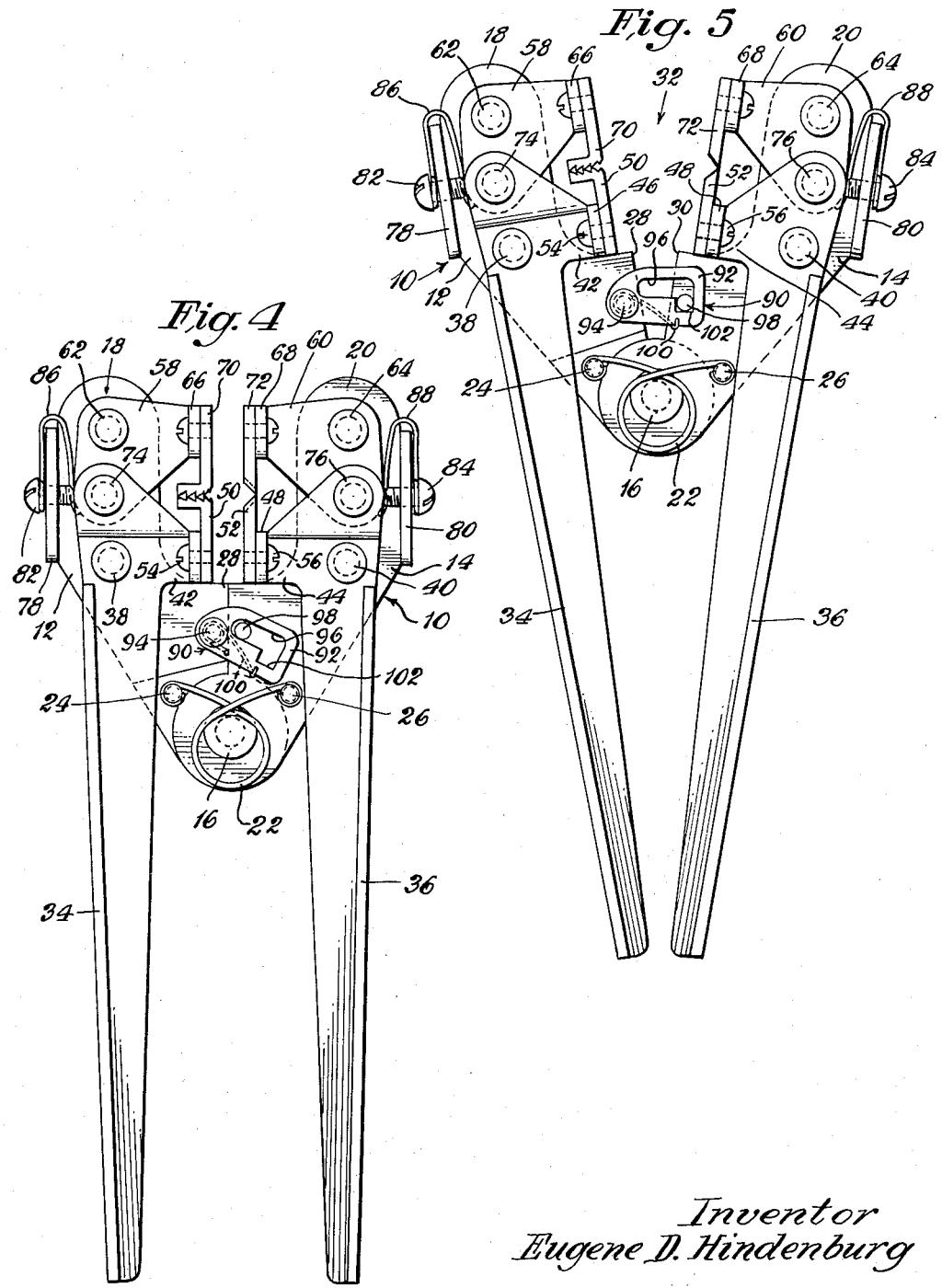

United States Patent Office 2,842,992
Patented July 15, 1958

2,842,992

WIRE STRIPPER

Eugene D. Hindenburg, De Kalb, Ill., assignor to Ideal Industries, Inc., Sycamore, Ill., a corporation of Delaware Application February 15, 1955, Serial No. 488,294

10 Claims. (Cl. 81—9.5)

This invention resides in the field of devices and mechanisms for stripping the insulation from the ends of electric wires or leads and is a new and improved stripper of the manually operable type adapted to more accurately strip and grasp the insulation from the wires and in general to have a smoother and more efficient action.

A primary object of my invention is a new and improved wire stripper with opposed clamping and stripping jaws, both of which are movable toward a central plane or station where a wire is positioned to be stripped so that, regardless of the wire size, the action of the clamping and stripping jaws will be uniform.

Another object is a device of the above type with means for regulating the approach of both sets of jaws to each other so as to regulate the stripping clamping action depending upon the size of the wire being stripped as well as its intended use.

Another object is a manually operable stripping tool of the above type with a double leverage action.

Another object is a manually operable stripper constructed so that the handle travel is reduced.

Another object is a stripper of the above type constructed so that clamping and stripping jaws can be positioned on both sides of the tool.

Another object is a manually operable stripping tool of the above type which gives double leverage during the cutting action of the blades through the insulation on the wires so that the return spring can be reduced in size.

Another object is a hand stripping tool of the above type which is easy to make, employs inexpensive parts, and can be rapidly assembled, so that it is easily, quickly, simply and cheaply produced.

Another object is a hand tool of the above type with a latch mechanism to prevent its lever mechanism from closing before the stripped wire has been removed so that the stripped portion of the wire will not be crushed or damaged.

Other objects will appear from time to time in the ensuing specification and drawings in which:

Figure 4 is a view similar to Figure 1 but showing the tool partially actuated with the clamping and stripping jaws closed; and Figure 5 is a view of the device shown in Figure 1 fully actuated.

Figure 1:
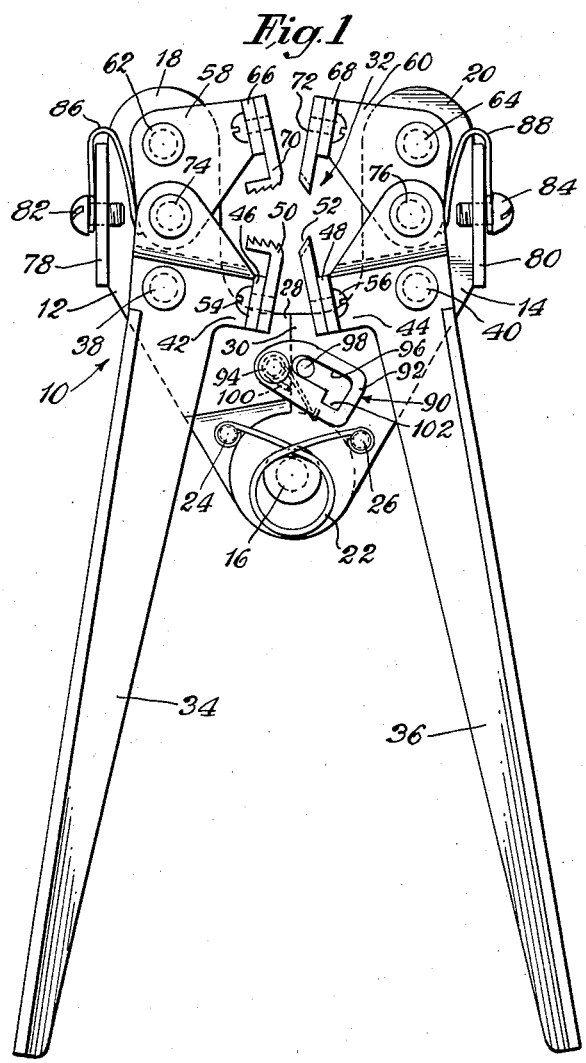
Figure 1 is a plan view of my new and improved hand stripper.
Figure 2:
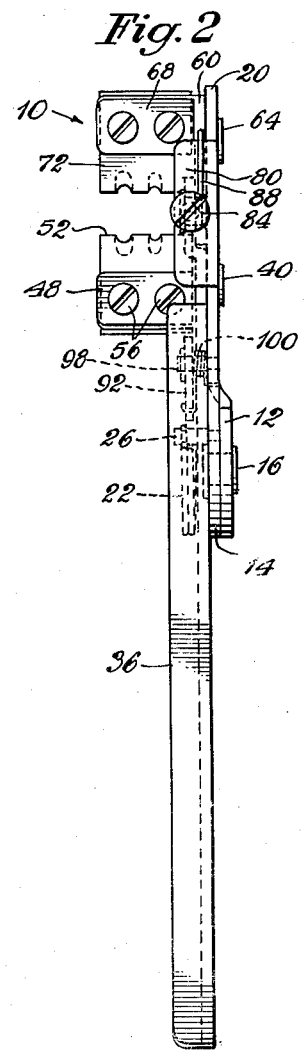
Figure 2 is a side view of Figure 1.

In Figure 1 the hand stripper is indicated generally at 10 and is composed of a pair of levers 12 and 14 pivoted together as at 16 at the lower end with upward extension 18 and 20. A coil spring or the like 22 connected to each of the levers as at the pins 24 and 26 biases the levers to the closed position shown in Figure 1 so that their inner edges 28 and 30 abut each other. The upper portions of these edges are cut away to provide a central slot or opening 32.

A pair of handles 34 and 36 are pivoted on the levers at 38 and 40. The handles are provided with inward extensions 42 and 44 which have bent portions or flanges 46 and 48 which carry clamping and stripping jaws 50 and 52 secured by any suitable connecting means such as screws 54 and 56.

Jaw carriers 58 and 60 are pivoted at 62 and 64 on the upper extensions of the lever member and extend inwardly to flanges or bent portions 66 and 68 which carry clamping and stripping jaws 70 and 72 generally opposed to the clamping and stripping jaws 50 and 52 on the handles.

It should be noted in Figure 1 that the handle and jaw carrier on each lever overlap slightly and are connected by a loose pivot type joint 74 and 76 so that these members can easily pivot on the levers.

The levers are provided with stops or abutments 78 and 80 behind the handles and jaw carriers, each carrying adjustable screws 82 and 84 or the like which oppose the back of the connection 58 and 60 between the jaw carriers and handles. The abutments carry springs 86 and 88 which bear against the back of the pivots 74 and 76 between the jaw carriers and handles to bias the jaws apart.

A latch mechanism, indicated generally at 90, is provided on the levers and includes a latch 92 pivoted at 94 to one lever with a cam opening or slot 96 overlying a pin 98 on the other lever. A coil spring 100 or the like biases the latch so that a notch 102 in the slot in the latch will fall over the pin when the levers are manipulated apart as shown in Figure 5. This will prevent the levers 12 and 14 from immediately returning to the closed position. When pressure is taken off of the handles the jaws will first be separated by the springs 86 and 88 so that the stripped wire can be withdrawn until the lower edge of the jaw 52 knocks the notch 102 off of the pin 98.

The use, operation and function of my invention are as follows:

I provide a manually operable stripping tool adapted to cut and strip the insulation from the ends of wires so that they can be twisted, soldered, welded, capped or otherwise suitably secured together.

My stripping tool has a pair of levers which are biased together or closed by a relatively strong spring. Each of the levers carries a pair of jaws. In one case the jaws are adapted to clamp or grab the insulation on the wires, and in the other case the jaws are adapted to cut through and strip the insulation. These jaws are carried by jaw carriers and handles. The jaw carriers are shown as pivoted to the levers as are the handles. Each jaw carrier and handle on a lever are also pivoted or otherwise connected together between their respective pivots so that upon manipulation of the handle, the lower jaws on the handles will be raised while the upper jaws will be lowered. In effect, the clamping and stripping jaws always move toward the same central plane regardless of the thickness of the wire that has been positioned between them to be stripped.

As soon as the clamping and stripping jaws have firmly grasped and cut the insulation of the wire, further movement of these members with respect to each other is prevented and the levers upon which they are mounted will separate as additional pressure is applied to the ends of the handles. This forces the levers apart while the clamping jaws still grasp the insulated wire and the stripping jaws or cutters will strip the insulation from the wires.

Figure 4 shows the position of maximum approach of the jaws and this position represents the point at which separation of the levers begins. Figure 5 shows the maximum separation of the levers and illustrates the operation of the latching mechanism. The latch 92 has been raised by its spring so that the notch 102 engages pin 98, and as the handles are released the levers will be held apart. Thus outward rotation of the handles will separate the clamping and stripping jaws allowing the stripped wire to be removed before the lower edge of the stripping jaw 52, as it moves downwardly, engages the top of the latch and knocks it off of the pin 98, releasing the levers.

Springs are provided to bias both sets of clamping and stripping jaws apart as at 86 and 88. These springs are weaker or have less resistance than the main spring 22 between the levers so that as inward pressure is applied to the handle, the springs 86 and 88 will be overcome first and the jaws will close before the levers separate. The closing of the jaws can be described as the cutting and clamping action. The separation of the levers can be described as the stripping action. Any suitable abutments which are adjustable are shown as provided behind the loose pivot between the jaw carriers and the handles. Thus the approach of the stripping jaws can be varied so that the stripping jaws will not nick or cut the wire after it is cut through the insulation. The same is true of the clamping jaws.

In prior manually operable strippers, generally one set of jaws are stationary while the others are movable. For example the upper jaws could be stationary while the lower jaws move up to them such as in U. S. Patent No. 2,770,154. When this type of stripper is used with a very thick wire, the jaws might be adjusted or positioned so as to operate efficiently. When a very thin wire was inserted between them, the lower clamping jaw would have a greater distance to travel than the lower stripping jaw so that the cutting jaws would be out of position with relation to the clamping jaws.

With my stripper, both the upper and lower jaws move toward each other and in effect they "home" on a center plane. Regardless of the thickness of the wire between them, the clamping and stripping action will be uniform, each jaw being required to cover half of the necessary distance. As the jaws move they will come together on parallel planes. Both move toward a center station. Each jaw must travel half of the distance and therefore the handle travel necessary to bring the jaws to their operative position is reduced by one half.

Figure 3:
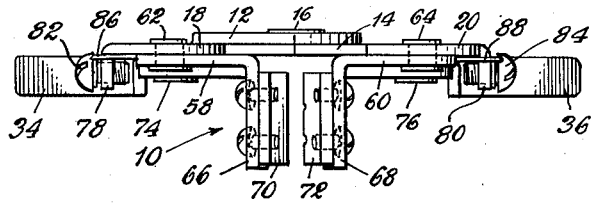
Figure 3 is a top view of the stripper shown in Figure 1.

It should be noted that while I have shown the jaws on only one side of the stripper as in Figure 3, they could be easily extended through the opening 32 to provide blades and jaws on each side. Thus a larger number of notches in the cutting jaws could be provided so that the tool could be used with a larger number of wire sizes. Springs 86 and 88 can bear against either the jaw carriers or handles. The screws 82 and 84 could be suitable cams. The pivots 74 and 76 could be changed to suitable gearing between the jaw carriers and handles.

Due to the double lever arrangement of each set of jaws, both the jaws moving toward the central position, the leverage during the cutting action is exactly doubled. If the insulation is tough, each cutting blade will be forced through half of it, the lower jaw through the bottom half and the upper jaw through the top. The distance the handles must be moved while the stripping jaws are penetrating the insulation is exactly one half of that of the usual stripper where either the upper or lower jaws, as in U. S. Patent No. 2,523,936, are stationary. During this cutting action as the insulation is being penetrated, the spring 22 holding the levers 12 and 14 together must resist the outward force applied to the levers until the blades penetrate the insulation. As the distance involved to penetrate the insulation as traveled by the handle is exactly one half of that of the normal stripper, the spring can be reduced in size and strength.

While I have shown and described the preferred form of my invention, it should be understood that numerous modifications, substitutions, alterations and changes can be made without departing from the essential theme. I therefore wish that my invention be unrestricted except as by the appended claims.

I claim:

1. In a tool adapted to strip insulation from a wire, a pair of levers pivoted together, handle elements pivoted on the levers carrying clamping and stripping jaws, jaw carrier elements movably mounted on the levers and carrying clamping and stripping jaws generally opposed to the jaws on the handle elements, and means connecting the jaw carrier and handle elements so that when the handle elements are actuated, the jaw carrier elements will be moved relative to the levers in a direction to close the jaws.

2. The structure of claim 1 in which the levers and jaw carrier elements are loosely pivoted together.

3. The structure of claim 1 characterized by and including means on at least one lever for engaging at least one set of jaws for independently regulating the approach of said one set of jaws.

4. The structure of claim 1 characterized by and including spring means connected to the levers for biasing the levers together.

5. The structure of claim 1 characterized by and including spring means engaging at least one of said elements to bias the pivoted handle elements and jaw carrier elements so as to separate each set of jaws.

6. In a wire stripper, a pair of opposed levers pivoted relative to each other at one end and spring biased to a closed position, a pair of handles pivoted on the levers, the pivot between each handle and lever being a substantial distance from the lever pivot, a first extension on each handle extending beyond the pivot between the lever and handle, a second extension on each handle adjacent its pivot projecting toward the opposite handle, jaws on the second extensions, one being a clamping jaw and the other a stripping jaw, a jaw carrier pivoted on each lever, clamping and stripping jaws on the carriers generally opposed to the clamping and stripping jaws on the handles, and means between the pivot for each handle and lever and the pivot for each lever and jaw carrier interconnecting the first extension on the handle and jaw carrier on each lever so that they will rotate in opposite directions to bring the jaws together upon manual operation of the handles.

7. The structure of claim 6 in which the first extension on the handle and the jaw carrier on each handle are connected by a loose pivot, and characterized by adjustable means on each lever for regulating the approach of both sets of jaws.

8. In a tool adapted to strip insulation from a wire, a pair of levers pivoted to each other, manually operable handles on the levers, a pair of opposed clamping jaws for one lever and handle each mounted for movement relative to the said one lever as well as relative to each other, a pair of opposed stripping jaws for the other lever and handle each mounted for movement relative to the said other lever as well as relative to each other, and connecting means between the handles and jaws so that, when the handles are actuated, the paired jaws will be opened and closed.

9. The structure of claim 8 in which the paired jaws pivot toward each other while closing when the handles are actuated.

10. The structure of claim 8 in which the handles are pivoted on the levers.

References Cited in the file of this patent

UNITED STATES PATENTS

| 2,313,793 | Wood | Mar. 16, 1943 |
| 2,523,936 | Axelsen | Sept. 26, 1950 |
| 2,659,254 | Wood | Nov. 17, 1953 |